US012612076B1

(12) United States Patent
Callis et al.

(10) Patent No.: US 12,612,076 B1
(45) Date of Patent: Apr. 28, 2026

(54) MANUFACTURER-BASED AUTONOMOUS DRIVING ASSESSMENT

(71) Applicant: United Services Automobile Association (USAA), San Antonio, TX (US)

(72) Inventors: Shayla Leigh Callis, Simi Valley, CA (US); Madhusudhana Rao Abburi, San Antonio, TX (US); Breanna Nicole Allerkamp, Boerne, TX (US); Surender Kumar, Palatine, IL (US); William Daniel Farmer, Carrollton, TX (US); Zachery C. Lake, Fort Wayne, IN (US); Stacy Callaway Huggar, San Antonio, TX (US); Jain Neetu, Coppell, TX (US); Jose J. Romero, Jr., San Antonio, TX (US); Andre Rene Buentello, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 87 days.

(21) Appl. No.: 18/306,804

(22) Filed: Apr. 25, 2023

Related U.S. Application Data

(60) Provisional application No. 63/335,988, filed on Apr. 28, 2022.

(51) Int. Cl.
 *B60W 60/00* (2020.01)
 *B60W 50/02* (2012.01)
 *B60W 50/06* (2006.01)

(52) U.S. Cl.
 CPC .... *B60W 60/0015* (2020.02); *B60W 50/0205* (2013.01); *B60W 50/06* (2013.01);
 (Continued)

(58) Field of Classification Search
 CPC . B60W 2050/0002; B60W 2050/0075; B60W 2050/0082; B60W 2050/041;
 (Continued)

(56) References Cited

U.S. PATENT DOCUMENTS 9,858,621 B1 * 1/2018 Konrardy ................. B60Q 9/00
10,676,098 B2 * 6/2020 Lundsgaard ........ G01M 17/007
 (Continued)

FOREIGN PATENT DOCUMENTS

CN 109711009 A * 5/2019

OTHER PUBLICATIONS

English translation of CN 109711009 (Year: 2019).*

*Primary Examiner* — Brandon Z Willis
(74) *Attorney, Agent, or Firm* — Fletcher Yoder, P.C.

(57) ABSTRACT

A computing system is configured to trigger an assessment for an autonomous driving system of an autonomous vehicle and receive driving data associated with the autonomous driving system. The driving data includes driving response data measured by one or more sensors employed on the autonomous vehicle during the assessment. The computing system is also configured to use machine learning to analyze the driving data through a driving performance analysis for identifying attributes of the autonomous driving system based on the driving data. The computing system is further configured to determine characteristics of the autonomous driving system using the machine learning based on the driving performance analysis and generate a risk profile that includes the identified attributes and the determined characteristics.

20 Claims, 3 Drawing Sheets

(52) U.S. Cl.
CPC . *B60W 2420/403* (2013.01); *B60W 2420/408* (2024.01); *B60W 2540/221* (2020.02); *B60W 2540/30* (2013.01); *B60W 2552/00* (2020.02); *B60W 2555/20* (2020.02)

(58) Field of Classification Search
CPC ..... B60W 2050/043; B60W 2050/021; B60W 50/0097; B60W 50/0098; B60W 50/045; B60W 50/06; B60W 50/0205; B60W 60/0015; B60W 2420/403; B60W 2420/408; B60W 2540/221; B60W 2540/30; B60W 2552/00; B60W 2555/20; B60W 2556/10; B60W 40/09; G06N 3/02; G06N 20/00
See application file for complete search history.

(56) References Cited

U.S. PATENT DOCUMENTS

2009/0210257 A1 * 8/2009 Chalfant ............... B60W 40/09
                                                            705/4
2017/0200325 A1 * 7/2017 Kumar ................. G07C 5/0808
2022/0340148 A1 * 10/2022 Rosenbaum ........ G06F 11/3409
2022/0365530 A1 * 11/2022 Foster .............. B60W 60/0015
2023/0060300 A1 * 3/2023 Rosenbaum ......... G09B 19/167
2023/0242153 A1 * 8/2023 Donderici ......... B60W 50/0097
                                                            701/36

* cited by examiner

*FIG. 4*

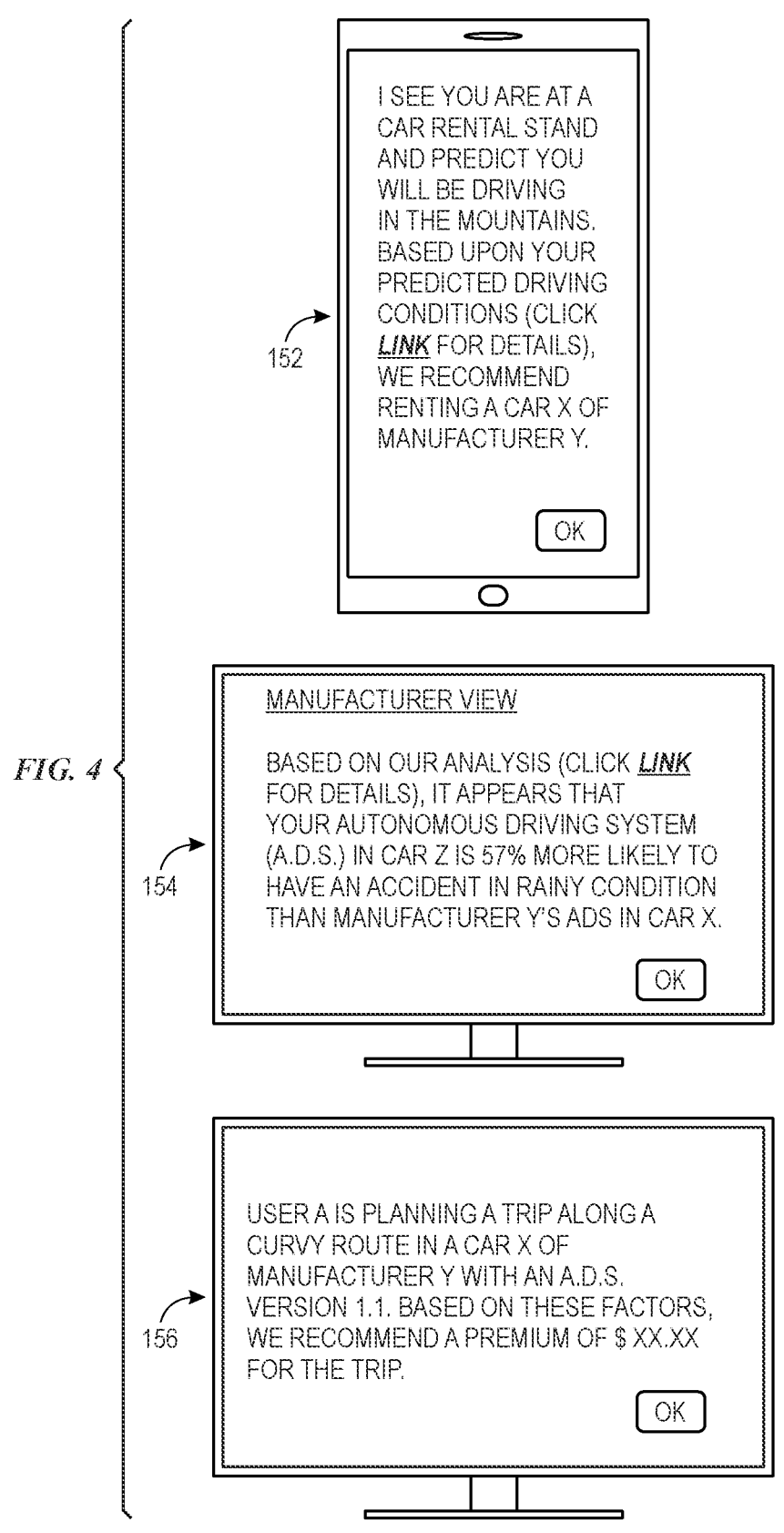

152

I SEE YOU ARE AT A CAR RENTAL STAND AND PREDICT YOU WILL BE DRIVING IN THE MOUNTAINS. BASED UPON YOUR PREDICTED DRIVING CONDITIONS (CLICK *LINK* FOR DETAILS), WE RECOMMEND RENTING A CAR X OF MANUFACTURER Y.

OK

154

MANUFACTURER VIEW

BASED ON OUR ANALYSIS (CLICK *LINK* FOR DETAILS), IT APPEARS THAT YOUR AUTONOMOUS DRIVING SYSTEM (A.D.S.) IN CAR Z IS 57% MORE LIKELY TO HAVE AN ACCIDENT IN RAINY CONDITION THAN MANUFACTURER Y'S ADS IN CAR X.

OK

156

USER A IS PLANNING A TRIP ALONG A CURVY ROUTE IN A CAR X OF MANUFACTURER Y WITH AN A.D.S. VERSION 1.1. BASED ON THESE FACTORS, WE RECOMMEND A PREMIUM OF $ XX.XX FOR THE TRIP.

OK

MANUFACTURER-BASED AUTONOMOUS DRIVING ASSESSMENT

CROSS-REFERENCE TO RELATED APPLICATION

The present application claims the benefit of and priority to U.S. Provisional Patent Application Ser. No. 63/335,988, titled "MANUFACTURER-BASED AUTONOMOUS DRIVING ASSESSMENT," which was filed on Apr. 28, 2022, and which is herein incorporated by reference in its entirety for all purposes.

BACKGROUND

The present disclosure relates generally to systems and methods related to autonomous driving assessment. More specifically, the techniques discussed herein relate to assessing autonomous driving systems in autonomous vehicles.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As autonomous driving systems become more prevalent, assessments related to autonomous driving become more important for improving various aspects of autonomous driving, such as safety, performance, flexibility, and adaptability. For example, to assess autonomous driving systems including various sensors, devices, and autonomous driving algorithms, driving performance analysis may be conducted to identify strengths and/or weaknesses of the autonomous driving systems implemented on autonomous vehicles. Based on the driving performance analysis, certain characteristics of the autonomous driving systems may be determined and recommendations (e.g., for types and characteristics of specific autonomous driving systems) may be provided for upcoming driving events (e.g., car rental or car sharing rides).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Current embodiments relate to a computing system that is configured to trigger an assessment for an autonomous driving system of an autonomous vehicle and receive driving data associated with the autonomous driving system. The driving data includes driving response data measured by one or more sensors employed on the autonomous vehicle during the assessment. The computing system is also configured to use machine learning to analyze the driving data through a driving performance analysis for identifying attributes of the autonomous driving system based on the driving data. The computing system is further configured to determine characteristics of the autonomous driving system using the machine learning based on the driving performance analysis and generate a risk profile that includes the identified attributes and the determined characteristics.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 illustrates examples of recommendations generated using the method of FIG. 3, in accordance with embodiments described herein.

DETAILED DESCRIPTION

Figure 1:
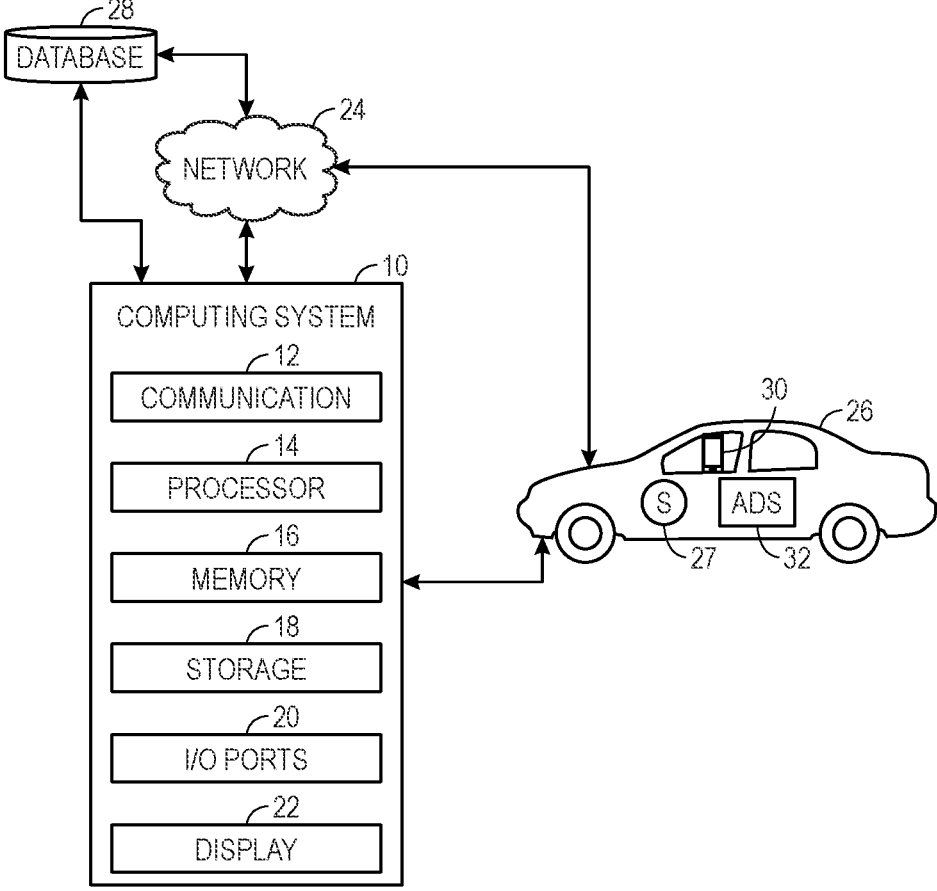
FIG. 1 illustrates a block diagram of a system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Autonomous vehicles may be referred to as vehicles incorporating vehicular automation technologies (e.g., mechatronics, artificial intelligence, machine learning, multi-agent systems) to assist users of the vehicles. The autonomous vehicles may sense surrounding environment and operate safely with limited human input. For example, the autonomous vehicles may use a variety of sensors (e.g., camera, radar, light detection and ranging (LIDAR), sonar, global positioning system (GPS), and inertial sensors) to perceive approaching vehicles, pedestrians, road condition, weather, traffic signs and signals, obstacles, and the like. The autonomous vehicles may use artificial intelligence and/or machine learning to analyze data acquired from the variety of sensors to identify potentially interfering vehicles or pedestrians, determine automation levels (e.g., driver hands on, hands off, eyes off, and mind off), and identify appropriate navigation routes.

With increasing use of the autonomous vehicles, autonomous driving is changing current transportation systems, ways to travel, and industries related to transportation and travel (e.g., automobile manufacturing, insurance, car rental, and sharing rides). Such changes create new challenges in various aspects of the autonomous driving, such as safety, performance, flexibility, and adaptability. For instance, in certain areas or locations, the current transportation systems (e.g., roads, signals, and regulations) may not be compatible (e.g., create challenges) for certain types of autonomous driving systems implemented on autonomous vehicles. Additionally, drivers may remain important for many years. Such factors may coexist with the autonomous driving before a transition to a fully autonomous driving environment completes. During the transition time, assessments of autonomous driving systems (e.g., driving performance assessments) with improved accuracies may impact the safety of the autonomous driving.

In comparison to conventional driving systems (e.g., driver operated systems), autonomous driving systems may have greater complexities that may include a variety of sensors, devices, software, and firmware. For example, the sensor may include optical sensors (e.g., cameras, Light Detection and Ranging (LiDAR) sensors), acoustic sensors (e.g., sensors capable of detecting audio commands of the drivers), speed or velocity sensors, accelerometer sensors, position sensors (e.g., global positioning system (GPS) sensors, sonar sensors), orientation sensors, temperature sensors, pressure sensors, voltage and current sensors, stress sensors, inertial sensors, and any other suitable sensors that may be used to facilitate autonomous driving.

The devices may include autonomous devices, such as auto-steering devices, auto-accelerating and auto-decelerating devices, auto-navigation devices, auto-transmission devices (e.g., automatic switching between different autonomous driving modes), and so forth. The devices may also include various circuitry, such as memory circuitry, processing circuitry, artificial intelligence (AI) circuitry, and the like. For example, the memory circuitry may be used for storage of autonomous driving algorithms and/or models that may account for different autonomous driving modes and for different driving conditions (e.g., road condition, weather, driver behavior) under each autonomous driving mode. For example, the autonomous driving modes may include partial automation, conditional automation, high automation, or full automation. The processing circuitry may include microcontroller units (MCUs), central processing units (CPUs), graphic processing units (GPUs), and any suitable circuitry that may be used to receive inputs from various sensors employed in different positions of autonomous vehicles and/or from users (e.g., drivers, passengers) and, based on the inputs, to execute codes (e.g., software, firmware) stored in the memory circuitry and related to the autonomous driving algorithms and/or models. The artificial intelligence circuitry may include AI-based (e.g., neural network) CPUs/GPUs that may be used to facilitate the processing circuitry to make improved driving decisions (e.g., optimal autonomous driving mode and/or algorithm, optimal route) based on advanced computing resources (e.g., processing power, machine learning, big data and data mining). In addition, with the coexistence of the drivers, driver behavior (e.g., real-time driving behavior monitored by the sensors, historical driving behavior such as safety driving records) may be used by the artificial intelligence circuitry to assist the processing circuitry to make improved driving decisions to account for human factors (e.g., errors, aggressive driving behavior).

The complexities described above regarding the autonomous driving systems present greater challenges for assessments of various autonomous driving systems. For example, the assessments of autonomous driving systems may include driving performance analysis that accounts for many aspects (e.g., sensors, automation devices, circuitry, autonomous driving algorithms and/or models) of the autonomous driving systems. Additionally, the driving performance analysis may be capable of accounting for other factors (e.g., the human factors) that may be related to the performance of the autonomous driving systems. It should be noted that, such factors may be outside a scope of autonomous driving system assessment. For example, the human factors, such as driver behavior (e.g., driving responses, driving habits), may be within a scope of safety driver assessment focusing on the drivers operating the autonomous vehicles. However, responses of the autonomous driving systems with respect to such factors (e.g., human errors) may be part of the autonomous driving system assessment due to the presence of human drivers in the autonomous vehicles.

With the proceeding in mind, during a process of an autonomous driving system assessment, a driving performance analysis may be conducted to identify strengths and/or weaknesses of an autonomous driving system being assessed with respect to the aspects and factors described above. For example, machine-learning algorithms may be used to detect the strengths and/or weaknesses of particular algorithms. Based on the driving performance analysis, certain characteristics (e.g., driving safety under specific conditions, reliability of certain autonomous driving algorithms) of the assessed autonomous driving system may be determined and a corresponding risk profile may be generated to include the identified strengths and/or weaknesses, determined characteristics, and other relevant information (e.g., driving conditions associated with the assessment). That is, the risk profile is attributed to the autonomous driving system being assessed, taking into account particular variables that may exist with each instance of using a respective autonomous driving algorithm.

Furthermore, with collections of risk profiles of different autonomous driving systems, recommendations based on the strengths and characteristics of a specific autonomous driving system may be provided to users. For example, a recommendation for a particular model of an autonomous vehicle may be provided to a group of drivers interested in an upcoming sharing ride. For another example, a recommendation for an autonomous driving system under one or more specific driving conditions may be provided to an autonomous vehicle manufacturer. In some embodiments, recommendations including custom-tailored insurance coverage premiums may be used to provide suggestions regarding particular types of rental cars and/or ride shares based on characteristics of upcoming journeys associated with various routes.

With this in mind, in some embodiments, a computing system may be used for conducting driving performance analysis with respect to an autonomous driving system during an assessment process. The autonomous driving system may include various sensing devices installed in an autonomous vehicle. The computing system may be communicatively coupled to a network and a database to facilitate the driving performance analysis based on sensing data generated by the various sensing devices during the assessment process. Additional details with regard to the computing system and the autonomous driving system will be discussed below with reference to FIG. 1.

In some embodiments, the computing system described above may trigger an assessment of an autonomous driving system. The computing system may receive driving data from a variety of data sources (e.g., sensors, user devices, networks, databases). For example, during the assessment of the autonomous driving system, the computing system may receive driving responses of the autonomous driving system and/or driving responses of a driver operating the autonomous vehicle via various sensors employed in different locations of the autonomous vehicle. In addition, the computing system may retrieve relevant data, such as historical data (e.g., safety record, driving history) associated with the autonomous driving system and/or with the driver. Based on analysis (e.g., machine-learning based analysis) of received driving data, the computing system may generate a risk profile of the autonomous driving system. Furthermore, the computing system may use, for example, machine learning algorithms, to predict certain characteristics of an upcoming autonomous ride and identify an autonomous driving system based on the characteristics of risk profiles of a group of autonomous driving systems. The identified autonomous driving system may be provided in a recommendation for users associated with the upcoming autonomous ride. Additional details with regard to generating the risk profile of the autonomous driving system and providing the recommendation based on the generated risk profile and other relevant risk profiles will be discussed below with reference to FIGS. 2 and 3.

The recommendation described above may be provided to different users in different formats. For example, the recommendation for a particular car model having an autonomous driving system may be provided to a user searching for an autonomous vehicle for an upcoming ride in a text message via a user device (e.g., a smart phone). In another example, the recommendation may be provided to a manufacturer of the autonomous vehicles in a report via a computing device (e.g., computer or server. Additional details regarding the formats and contents of the recommendation will be discussed below with reference to FIG. 4.

By way of introduction, FIG. 1 is a block diagram of a system communicatively coupled to a number of data sources. The system may include a computing system 10 communicatively coupled to a variety of data sources that may assist the computing system 10 in performing an assessment for an autonomous driving system 32 of an autonomous vehicle 26. Data from the variety of data sources may include, but are not limited to, measured driving response data of the autonomous driving system 32, such as response times with respect to different road and/or weather conditions measured on certain components, such as hardware (e.g., steering, accelerator, and brakes) and/or software (e.g., autonomous driving mode shift software, autonomous driving algorithm shift software) during the assessment; specification data of the autonomous driving system 32 such as types of sensing devices and automation devices, accesses to the sensing devices and/or the automation devices, autonomous driving modes, autonomous driving algorithms associated with each autonomous driving mode of the autonomous driving system 32; historical data of the autonomous driving system 32, such as safety records and reviews (e.g., driver review, manufacture review, third-party review); and any suitable data related to the autonomous driving system 32. In addition, the data may include traffic data, road condition data, weather data, reference data (e.g., average driving responses of other autonomous driving systems), and the like.

In certain embodiments where a driver is involved in the assessment of the autonomous driving system 32, the autonomous driving system 32 may be shutdown at certain time windows during the assessment and the driver may take over the autonomous vehicle 26 within these time windows, the data may include driver-related data, such as driver data (e.g., age, driving experience, location, physical conditions), driving history data (e.g., autonomous driving habits, frequent driving routes, incident reports), driving behavior data (e.g., driving responses measured during the assessment), safety driver data (e.g., level of autonomous driving, historical safety driving test result), and the like. As mentioned previously, these human factors may be a part of a safety driver assessment. However, influences of such human factors on the performance of the autonomous driving system 32 may be part of the assessment as long as the presence of the driver has certain interferences with the autonomous driving system 32 during the assessment. For example, delayed response times from one or more components (e.g., steering, brakes, mode shift software) of the autonomous driving system 32 caused by an operation error of the driver may not be taken into account in a driving performance analysis. However, response times from the one or more components associated with actions to correct or remedy (e.g., overwriting a manual driving mode) the operation error of the driver may be a part of the driving performance analysis.

The computing system 10 may include various types of components that may assist the computing system 10 in performing various types of computer tasks and operations. For example, the computing system 10 may include a communication component 12, a processor 14, a memory 16, a storage 18, input/output (I/O) ports 20, a display 22, and the like.

The communication component 12 may be a wireless or wired communication component that may facilitate communication between the computing system 10 and various other computing systems and devices via a network, the Internet, or the like. For example, the communication component 12 may allow the computing system 10 to obtain data from the variety of data sources, such as databases (e.g., autonomous driving system specification database, autonomous driving system history database, road condition database, weather information database, driver information database, user devices (e.g., smart phones, desktop computers, laptops, tablets), and the like. The communication component 12 may receive and send recommendations to the user devices. The communication component 12 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 14 may process instructions for execution within the computing system 10. The processor 14 may include single-threaded processor(s), multi-threaded processor(s), or both. The processor 14 may process instructions stored in the memory 16. The processor 14 may also include hardware-based processor(s) each including one or more cores. The processor 14 may include general purpose processor(s), special purpose processor(s), or both. For example, the special purpose processor(s) may include artificial intelligence processor(s) designed on the basis of machine learning and artificial neural network. The artificial intelligence processor(s) may perform the driving performance analysis (e.g., machine-learning based analysis) using received driving data, and a risk profile for each autonomous driving system being assessed. Furthermore, the artificial intelligence processor(s) may use, for example, machine learning algorithms, to predict certain characteristics of an upcoming autonomous ride and identify a particular autonomous driving system suitable for the upcoming autonomous ride based on certain characteristics of risk profiles of a group of autonomous driving systems (e.g., stored in a database). The processor 14 may be communicatively coupled to other internal components (such as the communication component 12, the storage 18, the I/O ports 20, and the display 22).

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from an operator of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10.

It should be noted that the components described above with regard to the computing system 10 are examples and the computing system 10 may include additional or fewer components relative to the illustrated embodiment. For example, the computing system 10 may include additional circuitry that may include artificial intelligence circuitry (e.g., neural network circuitry) for providing additional computing capabilities (e.g., advanced learnings and/or simulations based on big data).

In certain embodiments, the computing system 10 may be communicatively coupled to a network 24, which may include collections of computing systems, the Internet, an Intranet system, or the like. The network 24 may facilitate communication between the computing system 10 and various other data sources. For instance, the network 24 may be communicatively coupled to the autonomous driving system 32 on the autonomous vehicle 26. In some embodiments, the network 24 may also be communicatively coupled to one or more databases 28, which may store data regarding autonomous driving system specification data, autonomous driving system historical data, road condition data, weather data, driver data, and other information that may be relevant for performing the assessment of the autonomous driving system 32.

Referring back to the autonomous driving system 32, in some embodiments, the autonomous driving system 32 may monitor operations of the autonomous vehicle 26. For instance, the autonomous driving system 32 may monitor types of autonomous driving modes in use, frequency and time of each autonomous driving mode being used, types of autonomous driving algorithms in use in each autonomous driving mode, frequency and time of each autonomous driving algorithm being used, locations of the autonomous vehicle 26, frequency of use of the autonomous vehicle 26, times at which the autonomous vehicle 26 is in use, mileage driven by the autonomous vehicle 26, frequent routes of the autonomous vehicle 26, and the like. The autonomous driving system 32 may be communicatively coupled to various sensors 27 or devices within the autonomous vehicle 26 to acquire vehicle operation data of the autonomous vehicle 26. By way of example, the autonomous driving system 32 may be communicatively coupled to a GPS, an odometer, a dash camera and/or other onboard cameras, radar sensor(s). LIDAR sensor(s), sonar sensor(s), inertial sensor(s), and other suitable sensors or devices that may provide information regarding the operations of the autonomous vehicle 26.

In certain embodiments, the autonomous driving system 32 may cause the various sensors 27 or devices to measure driving response data of the autonomous driving system 32. For example, during an assessment, the autonomous driving system 32 may cause suitable sensors or devices (e.g., onboard cameras, motion sensors, speed sensors) to measure various driving responses (e.g., response times) of certain components (e.g., steering, accelerator, brakes, autonomous driving mode shift software, autonomous driving algorithm shift software) with respect to different road and/or weather conditions during the assessment. The autonomous driving system 32 may also cause suitable sensors or devices (e.g., LIDAR sensors, inertial sensors) to measure additional data related to the driving response measurements, such as speeds, distances or directions of approaching vehicles, distances from traffic signals or signs, distances from nearby bikers, pedestrians, or obstacles, and so on.

In a presence of a driver with the autonomous vehicle 26 during the assessment, the autonomous driving system 32 may also cause corresponding sensors or devices to measure various driving responses of the driver, such as focusing on the road in a manual driving mode, response time and action when the autonomous driving system 32 shifts driving mode (e.g., from one autonomous driving mode to the manual driving mode), response time and action when the autonomous driving system 32 issues an alert or a warning (e.g., alerting a sharp curve ahead) in the manual driving mode, and the like.

The autonomous driving system 32 may include artificial intelligence processing units (e.g., artificial intelligence processors or circuits, memory storing code for analysis, modeling, or prediction based on artificial intelligence) designed for processing autonomous driving related data (e.g., the vehicle operation data, the response data) and making corresponding operations (e.g., maintaining current autonomous driving mode or changing to a different mode) based on processing output. The autonomous driving system 32 may also include a variety of autonomous driving algorithms designed for different driving conditions (e.g., weather, crowdedness, road curvature, terrain, traffic regulation, and signage), different levels of safety driving experience, or a combination thereof.

Although the autonomous driving system 32 and the one or more databases 28 are described as being communicatively coupled to the computing system 10 via the network 24, it should be noted that, in other embodiments, the autonomous driving system 32 and the one or more databases 28 may be communicatively coupled directly to the computing system 10.

The computing system 10 may use the communication component 12 to receive data collected by the autonomous driving system 32, such as the vehicle operation data, the driving response data, the additional data related to the driving response measurements, information received from the occupants, and monitored usage of mobile devices during operations of the autonomous vehicle 26. The computing system 10 may further process the received data (e.g., using artificial intelligence) and output processed data (e.g., a safety driving score, settings of a dynamic autonomous driving). The computing system 10 may also use the communication component 12 to transmit the data collected by the autonomous driving system 32 or the processed data to the one or more databases 28 for storage. The stored data may be retrieved by the computing system 10 to provide autonomous driving related services, such as a safety driver recommendation for occupants of an autonomous vehicle for an upcoming route or an enablement of a dynamic autonomous driving. The computing system 10 may use the communication component 12 to transmit data associated with the autonomous driving related services to the mobile devices 30 or the autonomous driving system 32.

As mentioned above, the computing system 10 may receive a request from a user device for assessing the autonomous driving system 32. In one embodiment, the computing system 10 may receive the request from an occupant of the autonomous vehicle 26 via mobile devices 30 (e.g., mobile phones, tablets, laptop computers, smart watches, and the like). In another embodiment, the computing system 10 may receive the request from other users (e.g., a representative of a rental car company or an automobile insurance company, an autonomous vehicle manufacturer) via different user devices (e.g., computers, servers). In addition, the computing system 10 may send a recommendation for a particular autonomous driving system (e.g., for an upcoming journey or a shared ride) to the occupant via the mobile devices 30, or to the representative of the automobile insurance company.

Figure 2:
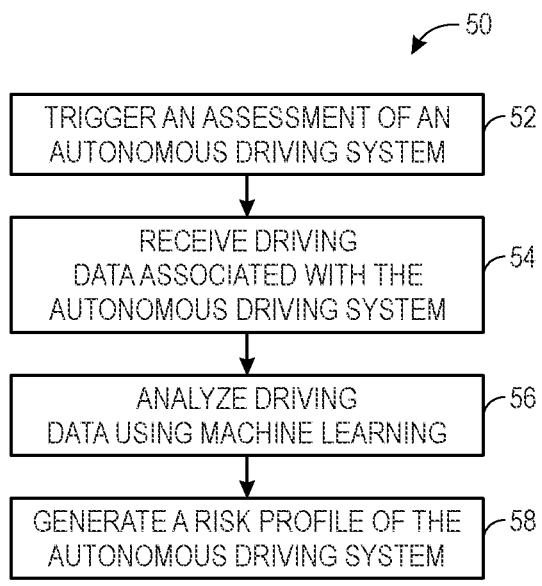
FIG. 2 illustrates a flow chart of an example method for generating a risk profile of an autonomous driving system using the system of FIG. 1, in accordance with embodiments described herein.

With the foregoing in mind, FIG. 2 illustrates a flow chart of an example method 50 for generating a risk profile of an autonomous driving system using the computing system 10 described above. The computing system 10 may perform operations described below via the processor 14 based on processor-executable code stored in the memory 16 and the storage 18. The processor 14 may execute the processor-executable code to perform an autonomous driving system assessment. Based on driving responses measured during an assessment of an autonomous driving system (e.g., the autonomous driving system 32) and other relevant driving data, the processor 14 may generate a risk profile of the autonomous driving system.

Referring now to FIG. 2, at block 52, the computing system 10 may trigger an assessment of an autonomous driving system. For example, the computing system 10 may receive a request for assessing the autonomous driving system and trigger the assessment in response to receiving the request. In some embodiments, the request may be created and sent, via various user devices (e.g., smart phones, tablets, laptops, desktop computers), from a user (e.g., an occupant of an autonomous vehicle equipped with the autonomous driving system). For instance, the user may use an application (e.g., autonomous driving system assessment app or website) operating on the user devices to create the request. In some embodiments, the user may use voice commands on a smart device (e.g., smart speaker) to create the request. In some embodiments, a representative of a rental car company or an automobile insurance company may create and send the request via a server. In some embodiments, the request may be initiated by a third-party entity, such as an autonomous driving vehicle assessment agency/organization.

In some embodiments, the assessment of the autonomous driving system may be triggered based upon detection of particular features of the current conditions. For example, if an understanding of how the autonomous driving system performs on hilly terrain and the computing system 10 becomes aware of upcoming hilly terrain (e.g., based upon analysis of a topographical map of the current route), the computing system 10 may trigger the assessment. Further, a number of complex conditions (e.g., a combination of multiple characteristics, such as hilly terrain and snowy) may be used to trigger the assessment (e.g., as identified based upon the topographical map and weather data received from an electronic weather service). In some embodiments, the triggering conditions may be identified based upon predicted likely conditions that vehicles will experience. For example, if a car rental service desires to understand how autonomous driving systems react to likely conditions in a particular area, a prediction model may identify key conditions for a supplied area and set these key conditions as the trigger conditions. For example, when supplied "Northern California", the prediction model may indicate key conditions of sunny and/or foggy and hilly. Thus, a fleet of available cars equipped with the autonomous driving system 32, could be controlled to trigger based upon these identified conditions. This may be of particular use when the car rental service does not currently rent cars in the supplied area and cannot evaluate autonomous driving systems of cars already performing in the area, cars outside the supplied area may be used to assess handling of conditions likely found in the supplied area.

The request may include input regarding the assessment, such as types of autonomous driving system and associated autonomous vehicle, types of autonomous driving modes and algorithms associated with the autonomous driving system, driving conditions (e.g., weather, crowdedness, road curvature, terrain, traffic regulation, and signage), desired time or time range, location, driver information (if a driver involved during the assessment), and the like. Based on the request and other relevant information (e.g., information retrieved from one or more databases that may be related to the request), the computing system 10 may determine one or more autonomous driving tests. For each autonomous driving test, the computing system 10 may determine, for example, using artificial intelligence processor(s) and/or additional artificial intelligence circuitry equipped with one or more machine learning algorithms, a set of criteria (e.g., time, location, driving condition) regarding the corresponding autonomous driving test. The set of criteria may be determined to ensure a safety driving of the autonomous vehicle during the corresponding autonomous driving test.

For example, in one embodiment, a series of autonomous driving tests may be determined to take place on certain urban roads at different times (e.g., when traffic is light, moderate heavy, and heavy) and/or under different weather conditions (e.g., sunny, raining, or snowing). Such locations, times, and/or weather conditions, may be determined by the computing system 10 using machine learning algorithms based on various input data, such as user input data indicating the assessment may include assessing driving performance of the autonomous driving system on urban environment with different traffic and/or weather conditions, and other input data related to the user input data and retrieved from corresponding databases (e.g. road map and condition database, weather database). In another embodiment, a different series of autonomous driving tests may be determined to take place on certain mountain roads with different road curvatures, visibilities, obstacles, or the like.

After triggering the assessment of the autonomous driving system, at block 54, the computing system 10 may receive driving data associated with the autonomous driving system. The computing system 10 may receive the driving data from a variety of data sources (e.g., sensors, user devices, networks, databases) in each of the one or more autonomous driving tests. The received driving data may include measured driving response data of certain components (steering, accelerator, brakes, autonomous driving mode shifting software, autonomous driving algorithm shifting software) of the autonomous driving system during the assessment, specification data of the autonomous driving system (e.g., types of and/or accesses to sensing devices and automation devices, autonomous driving modes, autonomous driving algorithms associated with each autonomous driving mode), historical data of the autonomous driving system (e.g., safety records, reviews from drivers, manufacturers, or third parties), and any suitable data related to the autonomous driving system, such as traffic data, road condition data, weather data, reference data (e.g., average driving responses of other autonomous driving systems), and the like. Additionally, in a presence of a driver who may interfere with the autonomous driving during the assessment, the driving data may include driver-related data, such as driver data (e.g., age, driving experience, weather conditions driver has experience driving in, geographic locations the driver has experience driving in, physical conditions), driving history data (e.g., driving habits, frequent driving routes, incident reports), driving behavior data (e.g., driving responses measured during the assessment), safety driver data (e.g., levels of autonomous driving, historical safety driving test result), and the like.

At block 56, the computing system 10 may analyze the driving data using machine learning. The computing system 10 may use artificial intelligence processor(s) and/or additional artificial intelligence circuitry to analyze received data, such as the user input presented in the request for assessing the autonomous driving system and the driving data described above. The computing system 10 may use various analytic techniques, such as data mining, data filtering, similarity analysis, simulation and/or modeling, prediction, and the like, to perform the data analysis. Such analytic techniques may be based on machine learning or may use one or more machine learning algorithms.

As used herein, the machine learning may refer to algorithms and statistical models that computer systems (e.g., computing system 10) use to perform a specific task with or without explicit instructions. For example, a machine learning process may generate a mathematical model based on a sample of the clean data, known as "training data," in order to make predictions or decisions without being explicitly programmed to perform the specific task. Depending on the inferences to be made, different machine learning algorithms may be used to analyze the driving data.

In some embodiments, a supervised machine learning algorithm may be implemented using a mathematical model of a set of driving data samples referred to as "training data" and containing both inputs and desired outputs. Each driving data sample may include one or more inputs and corresponding desired one or more outputs, also known as supervisory signals. In the mathematical model, each driving data sample may be represented by an array or vector, sometimes called a feature vector, and the training data may be represented by a matrix. Through iterative optimization of an objective function, the supervised machine learning algorithm may learn a function (e.g., optimal function) that can be used to predict outputs associated with new inputs. That is, the optimal function may allow the supervised machine learning algorithm to correctly predict corresponding outputs for certain inputs that are not presented in the training data. Such algorithm that improves the accuracy of its outputs or predictions over time is said to have learned to perform the specific task.

Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how two objects (e.g. two sets of measured driving performance data from two different autonomous driving systems) are similar or related.

Additionally and/or alternatively, in some embodiments, an unsupervised machine learning algorithm may be implemented (e.g., when particular output types are not known). The unsupervised learning algorithm may take a set of driving data samples that contains only inputs, and find structure in the driving data samples, such as grouping or clustering of the driving data samples. The unsupervised learning algorithm, therefore, learn from the driving data samples that have not been labeled, classified, or categorized. Instead of responding to feedback, unsupervised learning algorithms identify commonalities in the driving data and react (e.g., predict outputs) based on the presence or absence of such commonalities in each new piece of driving data.

Cluster analysis is the assignment of a set of observations (e.g., on driving data samples) into subsets (called clusters) so that observations within the same cluster are similar according to one or more predesignated criteria (e.g., driving conditions), while observations drawn from different clusters are dissimilar. Different clustering techniques make different assumptions on the structure of the driving data, often defined by some similarity metric and evaluated, for example, by internal compactness, or the similarity between autonomous driving systems or autonomous driving algorithms of the same cluster.

The data analysis of the driving data may include a driving performance analysis conducted, for example, by the artificial intelligence processor(s) and/or additional artificial intelligence circuitry using the one or more machine learning algorithms described above. The driving performance analysis may be conducted to identify attributes (e.g., strengths and/or weaknesses of sensors, actuators, machine learning and artificial intelligence algorithms, and processors to execute algorithms) of the autonomous driving system being assessed with respect to every aspect (e.g., sensors, automation devices, circuitry, autonomous driving algorithms and/or models) and factors (e.g., driver behavior). Based on the driving performance analysis, certain characteristics (e.g., driving safety under specific driving conditions, reliability of certain autonomous driving modes and algorithms) of the autonomous driving system may be determined. For example, the machine learning may identify frenetic control commands and/or outputs that may indicate under-compensation and/or over-compensation for particular autonomous commands under certain conditions, associated with the certain autonomous driving systems. For example, in snow, it may be identified that an Autonomous Driving System A provides frenetic control commands (e.g., a multitude of left and right steering commands and/or a multitude of acceleration and braking commands that exceed a baseline threshold of commands) when turning corners greater than a certain angle (e.g., 45 degrees), causing the assessment of the Autonomous Driving System A to be lower in snow than an Autonomous Driving System B that does not include such frenetic control commands in similar conditions.

Alternatives to frenetic control commands and/or outputs may be used in the driving performance analysis. For example, sensor data may be used to identify Roll, Pitch, and Yaw of the vehicle under test, where values of the characteristics may be compared to acceptability thresholds. As the magnitude of divergence of the measured values diverges from the acceptability thresholds, the assessment scoring of the autonomous driving system may diminish. Another feature that may be used in the driving performance analysis, is an amount of manual override intervention that is present. For example, in some embodiments, the more manual override intervention that is present, the more diminished the autonomous driving system assessment score becomes. In some embodiments, driver characteristics, such as age, gender, experience level, etc. may be used to weigh how much the manual override intervention should impact the assessment scores. These weights may be discerned using machine learning. For example, machine learning may indicate that an 18 year old driver is 50% more likely to trust the autonomous driving system than a 50 year old driver is. Accordingly, based upon this discernment, the weights may be adjusted such that it may take 50% more manual intervention events by the 18 year old driver to diminish the assessment score as compared to diminishing the assessment score based upon manual intervention events by the 50 year old. In this manner, mitigation techniques are provided to remove human subjectivity from the assessment.

After analyzing the driving data, at block 58, the computing system 10 may generate a risk profile of the autonomous driving system. The risk profile may include the identified strengths and/or weaknesses, determined characteristics, and other relevant information (e.g., driving conditions associated with each autonomous driving test associated with the assessment). That is, the risk profile may be generated by taking into account particular variables that may exist with the autonomous driving tests each including an instance of using a respective autonomous driving mode or algorithm for a specific driving condition. The risk profile may be stored in a database (e.g., autonomous driving system history database) for other data analysis.

Although the example method 50 described in FIG. 2 is described in a particular order, it should be noted that the example method 50 may be performed in any suitable order and is not limited to the order presented herein. It should also be noted that although each processing block is described in the example method 50 as being performed by the computing system 10, other suitable computing systems may perform the methods described herein.

Figure 3:
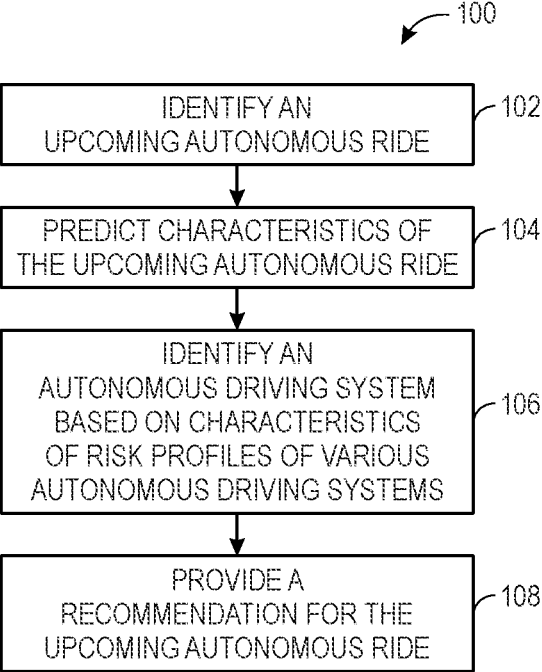
FIG. 3 illustrates a flow chart of an example method for providing a recommendation for an upcoming autonomous ride based on the risk profile of FIG. 2, in accordance with embodiments described herein.

FIG. 3 illustrates a flow chart of an example method 100 for providing a recommendation for an upcoming autonomous ride based on the risk profile described in the example method 50 associated with FIG. 2. The computing system 10 may perform operations described below via the processor 14 based on processor-executable code stored in the memory 16 and the storage 18. The processor 14 may execute the processor-executable code to predict certain characteristics of an identified upcoming autonomous ride and identify a particular autonomous driving system based on characteristics of risk profiles of different autonomous driving systems. Based on the identified particular autonomous driving system, the processor 14 may generate a recommendation for the identified upcoming autonomous ride.

Referring now to FIG. 3, at block 102, the computing system 10 may identify an upcoming autonomous ride. In some embodiments, the computing system 10 may receive an indication that one or more users may be interested in an autonomous ride. The indication may be sent from user devices (e.g., smart phones, smart speakers, tablets, laptops, or desktop computers) associated with the one or more users (e.g., occupants of an autonomous vehicle to be used in the autonomous ride). The indication may include autonomous ride information, such as desired time(s), and location(s). The indication may also include user information (e.g., name, driver license number). In some embodiments, the indication may be sent from an organization computing system (e.g., server) associated with an organizations that may have certain relationships with the one or more users. For example, the one or more users may visit (e.g., in person or online) a rental car company or an automobile insurance company and may indicate an autonomous ride is desired. The organization may send, via the organization computing system, the indication to the computing system 10. The indication may include the autonomous ride information, user information, desired rental period(s) and location(s), and additional information regarding the autonomous ride and/or the one or more users. For instance, the additional information may include one or more autonomous vehicles having certain autonomous driving systems interested by the one or more users, one or more car rental records (e.g., conventional and/or autonomous vehicle rental history) associated with the one or more users, one or more driving records (e.g., safety records, incident reports) associated with the one or more users, and the like.

In some embodiments, the computing system 10 may identify the upcoming autonomous ride using machine learning. The computing system 10 may periodically (e.g., every day, every three days, or every week) or randomly query certain databases for indications that the one or more users may be interested in an autonomous ride. For example, the computing system 10 may query a driver information database for car rental records associated with the one or more users. The computing system 10 may use one or more machine learning algorithms described above to analyze the car rental records and predict the upcoming autonomous ride based on certain trends identified in analytic result (e.g., similarity analysis, pattern recognition, or trend prediction) of the car rental records. In certain embodiments, the computing system 10 may query other databases, such as social media databases, for information (e.g., messages, blogs, posted photos or audio/video data) that may be related to an upcoming autonomous ride (e.g., indications of historical autonomous ride(s) and desires to have one or more autonomous rides). Accordingly, in addition to use of machine learning, the data analysis may include big data, data mining, and other suitable data processing techniques that are capable of processing a vast amount of data described in present example.

After identifying the upcoming autonomous ride, at block 104, the computing system 10 may predict characteristics of the upcoming autonomous ride. The characteristics may be predicted using artificial intelligence and/or machine learning described above and based on certain identifiers associated with the upcoming autonomous ride. For example, the identifiers may be related to time, location, and user information (e.g., name, driver license number) associated with the upcoming autonomous ride. Such identifiers may be determined by the computing system 10 based on one or more indications described at block 102.

The computing system 10 may retrieve autonomous ride related data by querying one or more databases based on the identifiers. For example, the computing system 10 may use time and location identifiers to query a weather database and a road map and condition database for predicted weather, crowdedness, road conditions (e.g., curvature, terrain, traffic regulation, signage), and other data related to the upcoming autonomous ride. Additionally, or alternatively, the computing system 10 may use user identifier(s), such as name and driver license number, to query a driver information database for driver data, such as levels of manual driving, types of autonomous driving systems and associated autonomous vehicles previously used, types of autonomous driving modes and algorithms previously used, and so on. The computing system 10 may analyze the retrieved autonomous ride related data using driving performance analysis to identify the attributes of the autonomous driving system.

Based on driving performance analysis, the computing system 10 may predict the characteristics of the upcoming autonomous ride. The characteristics may include, but are not limited to, weather, crowdedness, road curvature, terrain, traffic regulation, signage, levels of autonomous driving, types of autonomous driving systems and associated autonomous vehicles, types of autonomous driving modes and algorithms associated with the autonomous driving systems, and the like. The computing system 10 may transform the retrieved autonomous ride related data into particular data format(s) to facilitate other data analysis processes, such as identifying an autonomous driving system that will be discussed below with reference to block 106.

For examples, in some embodiments, the computing system 10 may transform the predicted characteristics into a characteristic vector that contains a single set of characteristics that represents, for example, a specific set of characteristics that an autonomous driving algorithm (e.g., safety-oriented dynamic autonomous driving algorithm) implemented in a specific autonomous driving mode (e.g., full automation) should handle for the upcoming autonomous ride. This may help identify a particular autonomous driving system with a highest assessment score, based upon the predicted characteristics. In some embodiments, the computing system 10 may transform the predicted characteristics into a 2D or 3D characteristic matrix that contains multiple sets of characteristics. For example, a 3D characteristic matrix may contain predicted characteristics representing a specific type of autonomous driving system (e.g., system Z with car X of manufacture Y). Each subset (or 2D matrix element) of the 3D characteristic matrix may contain predicted characteristics representing a specific type of autonomous driving mode (e.g., full automation). As such, one row of predicted characteristics (i.e., a vector) in the subset representing the full automation mode may contain predicted characteristics representing a safety-oriented dynamic autonomous driving algorithm implemented in the full automation mode of the specific autonomous driving system Z with car X of manufacture Y under snowing weather, moderate crowdedness, and curved mountain road condition.

At block 106, the computing system 10 may identify an autonomous driving system based on characteristics of risk profiles of various autonomous driving systems. As discussed above with reference to FIG. 2, each of the risk profiles may include a variety of characteristics, such as identified strengths and/or weaknesses, determined characteristics (e.g., indicated via assessment scores), and other relevant information (e.g., driving conditions associated with each driving test associated with the assessment) associated with a respective autonomous driving system. In some embodiments, the computing system 10 may use at least part of the predicted characteristics of the upcoming autonomous ride as searching criteria to query a database (e.g., autonomous driving system history database) for risk profiles having one or more similar characteristics as those in the at least part of the predicted characteristics of the upcoming autonomous ride. That is, the computing system 10 may pre-select a candidate group of risk profiles having one or more similar characteristics as the characteristics of the upcoming autonomous ride.

After pre-selecting the candidate group of risk profiles of autonomous driving systems, the computing system 10 may retrieve the candidate group of risk profiles from the database, and transform the retrieved candidate group of risk profiles into a candidate group of characteristic vectors/matrices, in a similar approach as to the data transformations discussed above with reference to block 104. Next, the computing system 10 may use artificial intelligence and/or machine learning to perform similarity analysis between the candidate group of characteristic vectors/matrices representing a group of candidate autonomous driving systems and the predicted characteristic vector/matrix representing the identified upcoming autonomous ride. Based on the similarity analysis (e.g., a vector similarity based on a vector distance), the computing system 10 may identify the autonomous driving system that may be suitable (e.g., with closest similarity) for the upcoming autonomous ride.

For example, the similarity analysis may include a nearest neighbor search to identify a closest (e.g., shortest distance) characteristic vector/matrix representing a particular autonomous driving system with respect to a predicted characteristic vector/matrix representing the identified upcoming autonomous ride. The nearest neighbor search may be based on a distance calculation algorithm, such as Euclidean distance calculation, cosine distance calculation, other suitable distance calculations, or combinations thereof. The nearest neighbor search may use machine learning. For example, a supervised machine learning algorithm (e.g., k-nearest neighbors (KNN) algorithm) may be used to identify a closest vector/matrix in the candidate group of characteristic vectors/matrices.

At block 108, the computing system 10 may provide a recommendation for the upcoming autonomous ride. The recommendation may be based on the identified autonomous driving system based on characteristics of risk profiles of various autonomous driving systems. The recommendation may include the identified autonomous system and an associated autonomous vehicle for the upcoming autonomous ride, reasons for the recommendation (e.g., characteristics of the identified autonomous driving system that may indicate strengths), and other information related to the recommendation (e.g., relevant contents in the risk profile and/or comparisons to other autonomous driving systems). In some embodiments, the recommendation may also be based on availability of autonomous driving systems. For instance, the computing system 10 may identify an autonomous driving system A of Car A for the recommendation. However, by checking the availability of the Car A with the autonomous driving system A, the computing system 10 may determine only autonomous driving systems B and C are available based on inventory of a car rental agency selected by the one or more users. As such, the computing system 10 may recommend the autonomous driving system B or C of Car A based on characteristics of risk profiles of the autonomous driving systems B and C.

The computing system 10 may provide various recommendations for different entities. The recommendations may be sent to the entities in different formats via different media and/or devices. For example, the computing system 10 may provide the recommendations in text messages accessible via mobile devices (e.g., smart phones, tablets), voice messages accessible via audio devices (e.g., smart speakers, blue tooth headphones), emails accessible via computing devices (e.g., desktop/laptop computers, servers), published messages/articles on the internet using various messaging patterns (e.g., publish-subscription pattern), and any other suitable formats to facilitate delivering processes of the recommendations.

With the preceding in mind, FIG. 4 illustrates examples of recommendations generated using the example method 100 of FIG. 3. In one embodiment, the computing system 10 may provide a recommendation 152 in a text message (or other graphical interface) to a user (e.g., customer in a rental car store) that will be selecting a car, via a mobile phone (or other electronic device). The recommendation 152 may include a reason for sending the text message (presence at a car rental stand), an identified upcoming autonomous ride (driving in the mountains), predicted characteristics of the upcoming ride that are provided as a clickable link, and a recommended rental car with an autonomous driving system (car X of manufacturer Y) (e.g., based upon the autonomous driving system assessment risk profiles that provide best assessment scores for the predicted driving conditions).

In one embodiment, the computing system 10 may provide information about a particular autonomous driving system to the manufacturer of the autonomous driving system via a recommendation 154 in a published article and/or graphical interface viewable by a manufacturer of a particular autonomous driving system (manufacturer view) on the internet that is accessible to a subscriber (manufacturer of autonomous vehicle Z) via a publisher-subscriber relationship/service. The recommendation 154 may include driving performance analysis results that are provided as a clickable link, a reason for the recommendation for an autonomous driving system in car X of manufacturer Y (which is 57% less likely to have an accident in rainy conditions than car Z of the manufacturer receiving the recommendation).

In one embodiment, the computing system 10 may provide an indication of use of a particular autonomous driving system along with recommendations based upon a risk assessment of the use (e.g., based upon the risk profiles). For example, a recommendation 156 in an email (or other graphical interface) is provided to a representative of an automobile insurance company. The recommendation 156 may include a reason for sending the email (user A is planning a trip along a curvy route in car X of manufacturer Y with an autonomous driving system version 1.1), and corresponding premium recommended for the trip, which is based upon the assessment scores for the autonomous driving system Version 1.1 with respect to curvy routes. The assessment scores are used to derive a risk of the autonomous driving, which may be used to calculate a premium specific to the autonomous trip.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

a communication component coupled to an autonomous driving system of an autonomous vehicle and to one or more sensors employed on the autonomous vehicle; and a processor remote from the autonomous vehicle configured to couple to the communication component, wherein the processor is configured to:

receive a request for an assessment of the autonomous driving system of the autonomous vehicle under a particular one or more conditions;

predict that the autonomous vehicle will experience the particular one or more conditions, by querying one or more databases with a location of the autonomous vehicle, the query returning the particular one or more conditions;

in response to predicting that the autonomous vehicle will experience the particular one or more conditions based on the location of the autonomous vehicle, trigger the assessment for the autonomous driving system by the autonomous vehicle via one or more commands sent by the processor to the autonomous vehicle via the communication component, the one or more commands instructing the autonomous vehicle to collect driving response data from the one or more sensors;

in response to triggering the assessment for the autonomous driving system of the autonomous vehicle, receive driving data associated with the autonomous driving system, wherein the driving data comprises the driving response data measured by the one or more sensors during the assessment, and wherein the driving response data comprises at least one of:

roll, pitch, and yaw values of the autonomous vehicle;

control commands of the autonomous driving system; or driver intervention data pertaining to the autonomous driving system;

analyze the driving data comprising the driving response data using machine learning, wherein analyzing the driving data comprises a driving performance analysis for identifying attributes of the autonomous driving system based on the driving data, and wherein the attributes comprise at least one of:

a subset of the roll, pitch, and yaw values of the autonomous vehicle based on the control commands of the autonomous driving system;

frenetic control of the autonomous vehicle based on the control commands of the autonomous driving system; or an amount of manual override intervention by a driver based on the driver intervention data;

determine characteristics of the autonomous driving system using the machine learning based on the identified attributes, wherein the characteristics of the autonomous driving system comprise a reliability of the autonomous driving system under the one or more conditions, and wherein the reliability of the autonomous driving system under the one or more conditions is determined by at least one of:

comparing the subset of the roll, pitch, and yaw values of the autonomous vehicle to acceptability thresholds; or evaluating an impact of the amount of manual override intervention by the driver based on driver characteristics of the driver;

generate a risk profile, wherein the risk profile comprises the identified attributes and the determined characteristics;

store the generated risk profile in a database; and provide an electronic response to the request for the assessment of the autonomous driving system of the autonomous vehicle under the particular one or more conditions, the electronic response comprising an indication of the generated risk profile.

2. The system of claim 1, wherein the processor comprises one or more artificial intelligence processors.

3. The system of claim 1, wherein the assessment comprises one or more autonomous driving tests using the autonomous driving system, wherein each of the one or more autonomous driving tests is monitored by the one or more sensors.

4. The system of claim 3, wherein the processor is configured to initiate the one or more autonomous driving tests during the assessment.

5. The system of claim 1, wherein the one or more sensors comprise one or more cameras, Light Detection and Ranging (LiDAR) sensors, acoustic sensors, speed or velocity sensors, accelerometer sensors, global positioning system (GPS) sensors, sonar sensors, orientation sensors, temperature sensors, pressure sensors, voltage or current sensors, stress sensors, inertial sensors, or a combination thereof.

6. The system of claim 1, wherein the driving data comprises specification data of the autonomous driving system, historical data of the autonomous driving system, traffic data, road condition data, geo location data, weather data, reference data, and driver-related data.

7. The system of claim 6, wherein the reference data comprises average driving responses of one or more autonomous driving systems different from the autonomous driving system.

8. The system of claim 6, wherein the driver-related data is associated with one or more drivers occupying the autonomous vehicle in one or more autonomous driving tests of the assessment, wherein the driver-related data comprises age, driving experience, locations, physical conditions, driving habits, frequent driving routes, incident reports, driving behaviour, levels of autonomous driving, and safety driving test result.

9. The system of claim 1, wherein the processor is configured to generate a recommendation for one or more users based on predicted characteristics associated with an autonomous ride using the machine learning, the risk profile of the autonomous driving system, and risk profiles of one or more different autonomous driving systems.

10. The system of claim 9, wherein the recommendation comprises manufacturer information associated with a manufacturer manufacturing the autonomous driving system, where in the manufacturer information comprises make, model and autonomous driving system version of the autonomous vehicle.

11. The system of claim 9, wherein the recommendation comprises a recommended insurance premium for the autonomous ride.

12. A method, comprising:

receiving a request for an assessment for an autonomous driving system of an autonomous vehicle under a particular one or more conditions;

predicting that the autonomous vehicle will experience the particular one or more conditions, by querying one or more databases with a location of the autonomous vehicle, the query returning the particular one or more conditions;

in response to predicting that the autonomous vehicle will experience the particular one or more conditions based on the location of the autonomous vehicle, triggering the assessment for the autonomous driving system by the autonomous vehicle via one or more commands sent by a processor to the autonomous vehicle via a communication component, the communication component is coupled to the processor and the autonomous vehicle, and the processor is remote from the autonomous vehicle;

causing one or more sensors employed on the autonomous vehicle to measure driving response data of the autonomous driving system during the assessment via the one or more commands sent by the processor to the autonomous vehicle via the communication component, the communication component is further coupled to the one or more sensors;

in response to triggering the assessment for the autonomous driving system of the autonomous vehicle, receiving driving data associated with the autonomous driving system via a communication component, wherein the driving data comprises the driving response data measured by the one or more sensors during the assessment, and wherein the driving response data comprises at least one of:

roll, pitch, and yaw values of the autonomous vehicle;

control commands of the autonomous driving system; or driver intervention data pertaining to the autonomous driving system;

analyzing the driving data comprising the driving response data using machine learning, wherein analyzing the driving data comprises a driving performance analysis for identifying attributes of the autonomous driving system based on the driving data, and wherein the attributes comprise at least one of:

a subset of the roll, pitch, and yaw values of the autonomous vehicle based on the control commands of the autonomous driving system;

frenetic control of the autonomous vehicle based on the control commands of the autonomous driving system; or an amount of manual override intervention by a driver based on the driver intervention data;

determining characteristics of the autonomous driving system using the machine learning based on the identified attributes, wherein the characteristics of the autonomous driving system comprise a reliability of the autonomous driving system under the one or more conditions, and wherein the reliability of the autonomous driving system under the one or more conditions is determined by at least one of:

comparing the subset of the roll, pitch, and yaw values of the autonomous vehicle to acceptability thresholds;

evaluating an impact of the amount of manual override intervention by the driver based on driver characteristics of the driver;

generating a risk profile, wherein the risk profile comprises the identified attributes and the determined characteristics;

storing the risk profile in a database; and providing an electronic response to the request for the assessment of the autonomous driving system of the autonomous vehicle under the particular one or more conditions, the electronic response comprising an indication of the generated risk profile.

13. The method of claim 12, wherein the one or more sensors are configured to measure the driving data associated with the autonomous driving system by monitoring one or more autonomous driving tests during the assessment, and wherein each of the one or more autonomous driving tests comprises an instance of using a respective autonomous driving mode or algorithm for a specific driving condition.

14. The method of claim 13, wherein the determined characteristics further comprise:

driving safety under one or more driving conditions associated with the one or more autonomous driving tests; and reliability of one or more autonomous driving modes or algorithms associated with the autonomous driving system in the one or more autonomous driving tests.

15. The method of claim 12, wherein receiving driving data comprises using the communication component to obtain the driving data from one or more autonomous driving system specification databases, one or more autonomous driving system history databases, one or more road condition databases, one or more weather information databases, one or more driver information databases, one or more user devices, or any combination thereof.

16. The method of claim 12, wherein the identified attributes comprise strengths or weaknesses of sensors, actuators, machine learning and artificial intelligence algorithms, and processors to execute the machine learning and artificial intelligence algorithms associated with the autonomous driving system.

17. A non-transitory computer-readable medium comprising computer-executable instructions that, when executed, are configured to cause one or more processors to perform operations comprising:

receiving a request for an assessment for an autonomous driving system of an autonomous vehicle under a particular one or more conditions;

predicting that the autonomous vehicle will experience the particular one or more conditions, by querying one or more databases with a location of the autonomous vehicle, the query returning the particular one or more conditions;

in response to predicting that the autonomous vehicle will experience the particular one or more conditions based on the location of the autonomous vehicle, triggering the assessment for the autonomous driving system by the autonomous vehicle via one or more commands sent by a processor to the autonomous vehicle via a communication component, the communication component is coupled to the processor and the autonomous vehicle, and the processor is remote from the autonomous vehicle;

initiating one or more autonomous driving tests during the assessment;

causing one or more sensors employed on the autonomous vehicle to measure driving response data of the autonomous driving system associated with the one or more autonomous driving tests via the one or more commands sent by the processor to the autonomous vehicle via the communication component, the communication component is further coupled to the one or more sensors;

in response to triggering the assessment for the autonomous driving system of the autonomous vehicle, receiving driving data associated with the autonomous driving system via a communication component, wherein the driving data comprises the driving response data, and wherein the driving response data comprises at least one of:

roll, pitch, and yaw values of the autonomous vehicle;

control commands of the autonomous driving system; or driver intervention data pertaining to the autonomous driving system;

analyzing the driving data comprising the driving response data using machine learning, wherein analyzing the driving data comprises a driving performance analysis for identifying attributes of the autonomous driving system based on the driving data, and wherein the attributes comprise at least one of:

a subset of the roll, pitch, and yaw values of the autonomous vehicle based on the control commands of the autonomous driving system;

frenetic control of the autonomous vehicle based on the control commands of the autonomous driving system; or an amount of manual override intervention by a driver based on the driver intervention data;

determining characteristics of the autonomous driving system using the machine learning based on the identified attributes, wherein the characteristics of the autonomous driving system comprise a reliability of the autonomous driving system under the one or more conditions, and wherein the reliability of the autonomous driving system under the one or more conditions is determined by at least one of:

comparing the subset of the roll, pitch, and yaw values of the autonomous vehicle to acceptability thresholds;

evaluating an impact of the amount of manual override intervention by the driver based on driver characteristics of the driver;

generating a risk profile, wherein the risk profile comprises the identified attributes and the determined characteristics;

storing the risk profile in a database;

providing an electronic response to the request for the assessment of the autonomous driving system of the autonomous vehicle under the particular one or more conditions, the electronic response comprising an indication of the generated risk profile; and generating a recommendation for one or more users based on the risk profile.

18. The non-transitory computer-readable medium of claim 17, wherein the operations comprise:

predicting a set of characteristics associated with an autonomous ride; and transforming the predicted characteristics into a ride characteristic vector.

19. The non-transitory computer-readable medium of claim 18, wherein the operations comprise:

retrieving a plurality of risk profiles associated with a plurality of autonomous driving systems from the database, wherein the plurality of the plurality of autonomous driving systems comprises the autonomous driving system;

transforming the plurality of risk profiles into a plurality of autonomous driving system matrices each comprising one or more sets of characteristic vectors that represent one or more autonomous driving algorithm implemented in one or more autonomous driving mode associated with a respective autonomous driving system of the plurality of the plurality of autonomous driving systems; and using the machine learning to identify a candidate autonomous driving system for the autonomous ride based on a similarity analysis between the ride characteristic vector and the plurality of autonomous driving system matrices.

20. The non-transitory computer-readable medium of claim 19, wherein the similarity analysis comprises a nearest neighbour search to identify a closest characteristic matrix representing the candidate autonomous driving system with respect to the ride characteristic vector representing the autonomous ride, wherein the nearest neighbour search comprises a Euclidean distance calculation, a cosine distance calculation, or a combination thereof.

* * * * *